United States Patent [19]
Scott

[11] Patent Number: 5,878,116
[45] Date of Patent: Mar. 2, 1999

[54] METHOD OF LOCATING A LOST PET, PERSON OR OBJECT

[76] Inventor: James D. Scott, 7272 E. Gainey Ranch Rd., #10 Scottsdale, Ariz. 85258

[21] Appl. No.: 940,119

[22] Filed: Sep. 29, 1997

Related U.S. Application Data

[63] Continuation of Ser. No. 583,860, Jan. 11, 1996, abandoned, which is a continuation of Ser. No. 227,591, Apr. 14, 1994, abandoned.

[51] Int. Cl.⁶ .................................................. H04M 1/64
[52] U.S. Cl. .............................. 379/67; 379/201; 40/300
[58] Field of Search ................................ 379/67, 88, 89, 379/201, 213; 40/299, 300

[56] References Cited

U.S. PATENT DOCUMENTS

| | | | |
|---|---|---|---|
| 4,650,219 | 3/1987 | Sigman | 283/70 |
| 4,847,890 | 7/1989 | Solomon et al. | 379/67 |
| 4,878,239 | 10/1989 | Solomon et al. | 379/67 |
| 5,036,610 | 8/1991 | Fehr | 40/300 |
| 5,276,435 | 1/1994 | Rossides | 340/691 |
| 5,283,731 | 2/1994 | Lalonde et al. | 379/88 |
| 5,361,295 | 11/1994 | Solomon et al. | 379/67 |
| 5,369,900 | 12/1994 | Garrison | 40/299 |

OTHER PUBLICATIONS

"Earnings Briefs, Merrill Lynch Market Letter", Mar, 24, 1986 pp. 2–3.

*Primary Examiner*—Krista Zele
*Assistant Examiner*—Scott L. Weaver
*Attorney, Agent, or Firm*—Harry M. Weiss; Jeffrey D. Moy; Harry M. Weiss & Associates, P.C.

[57] ABSTRACT

A method of locating a lost item via a provided telephone service, using an identification number given on both an identification card held by the owner of the item, and on an identification tag worn or attached to the item. A telephone number is given on the identification card for the item owner to access the telephone service and open a voice mailbox under the identification number, and a telephone number is given on the identification tag for the finder of the item to access the telephone service and leave a message with the telephone service (either in the opened voice mailbox or with the service if the finder calls before the item owner opens the voice mailbox) regarding the whereabouts of the lost item.

6 Claims, 2 Drawing Sheets

METHOD OF LOCATING A LOST PET, PERSON OR OBJECT

This is a continuation of application Ser. No. 08/583,860 filed on Jan. 11, 1996, now abandoned, which is a continuation of application Ser. No. 08/227,591 filed on Apr. 14, 1994, now abandoned.

FIELD OF THE INVENTION

The present invention relates to a method of locating a lost item. The method is one wherein the item is tagged with an identification number, which said number is then used to open a telephone voice mailbox by the owner of the lost item; to leave a message of location by the finder of the lost item; and for the owner of the lost item to retrieve the messages of location left by the finder of the lost item.

BACKGROUND OF THE INVENTION

Owners of pets are always faced with the possibility of losing their animals. In an attempt to assure safe return of a lost pet, owners have placed their names, phone numbers and/or addresses on the pet tags worn by the pet, in hopes that the finder of the lost pet will contact the owner if the pet is found. If a pet is lost, this provides some direction and incentive to the finder of a pet to contact the rightful owner and safely return the animal.

Another method used by pet owners is to have a computer microchip or other information containing device surgically implanted into their animals. If the lost pet is found the chip or information may be removed by a veterinarian who may then read the information containing the phone number and/or address of the owner, who can then be contacted to pick up the pet.

Both of these methods, however, are dependent on several things. First, the phone number and address of the pet owner must be updated each time the pet owner relocates, or the tag becomes obsolete. This takes time and effort of the pet owner, and is often overlooked by the owners so that a lost pet cannot be returned to the rightful owner after the owner relocates. Additionally, these methods cost the finder of the lost pet time and money (e.g., money for one or more phone calls or visits to the veterinarian). This is an immediate disincentive for the finder to make any effort to return a found pet.

Additionally, there are existing services whereby an owner may register his/her name and address (and optionally telephone number) with the service, and provide this information and the service telephone number on a tag attached to the owner's pet. Thereby, if the pet is lost, the finder may call the service and leave a message for the owner of the pet regarding the whereabouts of the lost pet. This, however, also requires the updating of information registered with the service and contained on the pet tag. Moreover, all of these services existing today require a monthly or yearly fee which must be paid to the service to keep the information on file.

Another method used by pet owners after a pet is lost, consists of posting notices around the area where the pet was lost in an attempt to notify the finder of the identity of the rightful owner. These notices give the owners name, address and phone number. In addition to taking up valuable time of the pet owner in placing the notices around the area, this method relies on the luck of the finder seeing the notice, and the time and effort of the finder to contact the pet owner.

Similarly, many people have attached tags or notices to children, elderly or mentally incapacitated relatives, or personal objects, said tags or notices containing the name, address and/or phone number of the relative or owner who should be contacted if the person or object is found. The effectiveness of these methods, again, relies on the responsibility of the relative or object owner to update the information on the notice or tag in the event of a relocation, as well as the time and expense of the finder of the person or object to contact the relative or owner given on the notice or tag.

Despite the fact that these methods are often effective in returning a lost pet, person or object, they are burdensome to a pet owner, relative of a child or elderly or incapacitated person, or the owner of a personal object to constantly update the information on the tag each time there is a relocation. Often this is overlooked, and the tag or notice on the pet, person or object is outdated and obsolete. No one to date has developed a method whereby one can place a tag or notice on a pet, person or object just once, and use this same tag wherever one is located, no matter how many times an owner or relative relocates after the tag or notice is placed on the pet, person or object.

The present invention discloses a method whereby one may purchase a tag or notice with an identification number on the tag or notice, said tag or notice being attached or connected to any item. If the item is lost, the owner or relative can then call a given phone number, and use the identification number to open a voice mailbox. The finder of the lost item is then able to call a phone number located on the tag or notice, access the voice mailbox opened by the owner or relative, and give the exact location of the lost item.

Accordingly, an object of this invention is to provide a method whereby a pet owner can attach a tag to a pet once, which will provide an easy and effective way for the finder of the pet to leave a message for the pet owner to retrieve the lost pet, regardless of how many times the pet owner relocates between the time the tag is attached to the pet and when the pet is lost.

An additional object of the invention is to provide a method whereby a relative of a child or elderly or incapacitated person may attach a tag (e.g., bracelet, necklace, etc.) to the person, which will provide an easy and effective way for the finder of the child or elderly or incapacitated person to leave a message for the relative regarding where to find or pick-up the lost child or elderly or incapacitated person, without the need to update the information on the tag regardless of how many times the relative relocates after the tag is placed on the child or elderly or incapacitated person.

A further object of the invention is to provide a method whereby the owner of personal property can attach a tag or notice to the property, which will provide an easy and effective way for the finder of the lost property to leave a message for the owner regarding where to locate or pick-up the property, without the need to update the information on the tag or notice regardless of how many times the owner relocates after the tag or notice is placed on the object.

SUMMARY OF THE INVENTION

In accordance with these and other objects of the present invention, a method is provided which comprises providing a central telephone service; an identification tag to be placed on or attached to an item, said tag containing an identification number and a tag telephone number; and a card to be kept by the item owner containing the same identification number, but also containing a card telephone number whereby the item owner can call the central telephone service to open a voice mailbox under the identification number. Once the voice mailbox is opened, the finder of a lost item can call the tag telephone number on the tag, access the voice mailbox number by means of the identification number, and leave a message for the owner regarding the whereabouts of the lost item. The item owner then may call the telephone service occasionally to find if any messages were left in his/her mailbox and retrieve any such messages.

Alternatively, if the finder of the lost item calls the telephone service before the owner opens a voice mailbox, the finder may leave a message with the telephone service for the owner under the tag identification number. In this instance, when the owner calls to open the voice mailbox, the phone service notifies the owner of the existence of a pending message and provides instructions to the owner regarding how to access the saved message.

This method provides an inexpensive and accurate way of locating a lost pet, person or object, and eliminates the necessity of updating the information on the identification tag if the owner or relative relocates. Additionally, the user of this novel method is not required to pay any established (e.g., monthly or yearly) subscription fees. The item owner is provided with the identification tag and card, and uses the provided phone service only if and when the item is lost.

DETAILED DESCRIPTION OF THE INVENTION

Figure 1:
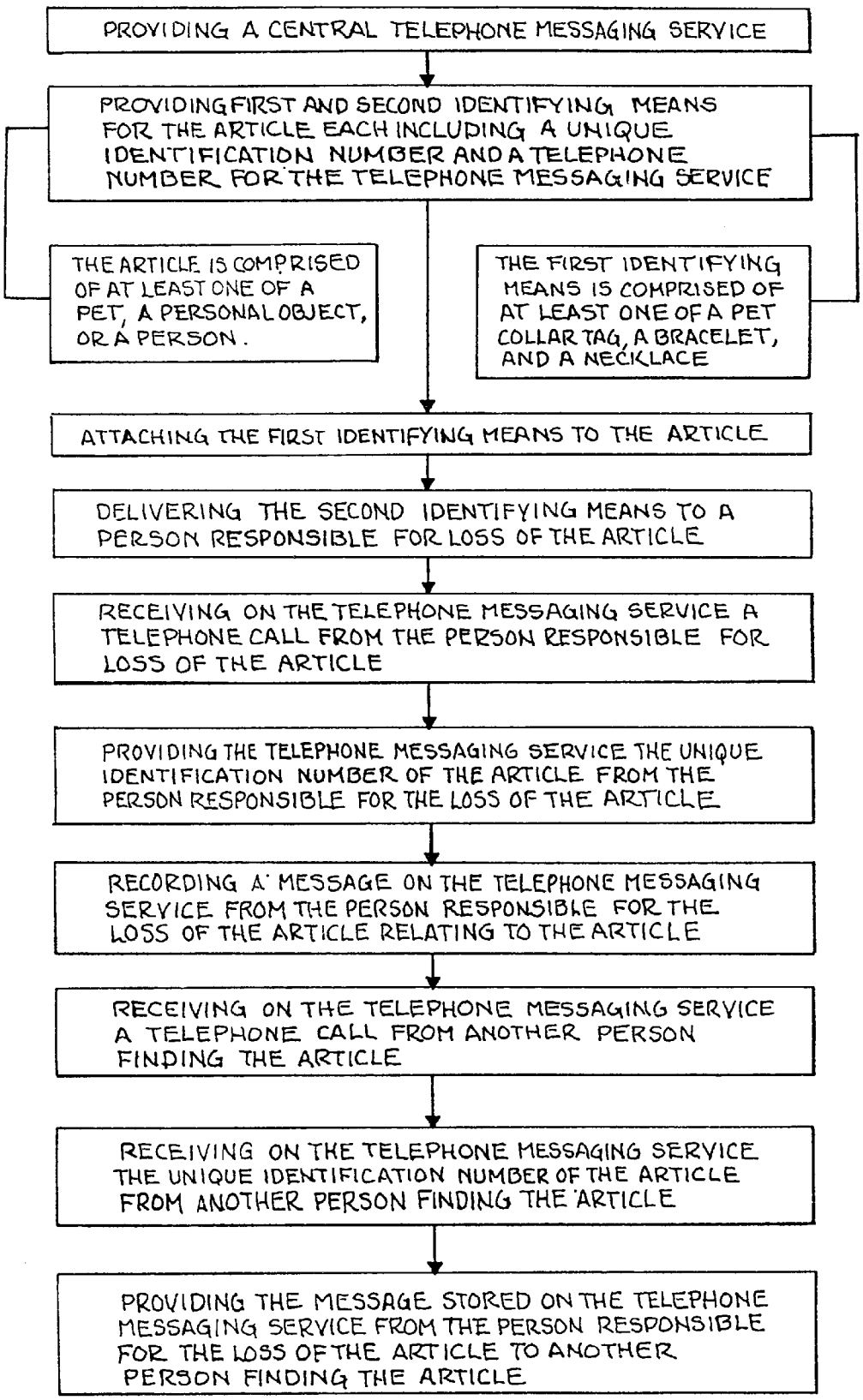
FIG. 1 is a flow chart illustrating the steps of one embodiment of the invention.

For the practice of one embodiment of the present invention, several items must be provided. First, an identification tag is required. The identification tag is attached or connected to one's pet, for example, on the collar of the pet. The identification tag contains an identification number specific for that pet, and no other tag sold would contain that identification number. The identification number can be any combination of numbers and/or letters. The identification tag also contains a telephone number to call in case the pet is found. This telephone number may be a toll free number (e.g., a 1-800-telephone number), or any type of telephone number which will cost a charge (e.g., a regular or 1-900-telephone number). The telephone number may be associated with a phrase such as, "If found, please call . . . ", or some other phrase to that effect.

Second, an identification card is provided for the pet owner. This card may take one of several forms, such as a wallet size or wallet type card, a piece of paper, a bracelet to be worn by the owner, or any other item capable of displaying information. This identification card contains the same identification number on the tag, specific for the owner's pet. The card also contains a telephone number to call in case the pet is lost (e.g., a 1-900-phone number), and instructions on what to do if the pet is lost. The telephone number provided on the identification card is called by the owner in case the pet is lost, which would connect the owner with a telephone service. After connection with the telephone service, the owner may then open a voice mailbox using the identification number provided on the identification tag and card. Once the voice mailbox is opened by the owner, the finder of the lost pet may then call the telephone number supplied on the identification tag worn by the pet, and access the voice mailbox opened by the owner. This way, a message may be left for the owner regarding the whereabouts of the pet.

Third, a central phone service is provided to accept any calls from pet owners to open a voice mailbox. The central phone service is of a kind commonly found in the art, and can be set up via any local or national telephone company. The central telephone service may accept calls by means of a computer system using a touch tone phone, or manually by an operator if the owner uses a rotary type phone. Additionally, the phone service is equipped to accept calls from a finder of a pet, allowing the finder to access the voice mailbox opened by the pet owner. This, again, may be done by means of a computer if the finder is using a touch tone phone, or manually by an operator if the finder of the pet is using a rotary type phone.

The telephone service is capable of accepting calls from a finder of a lost pet and routing those calls into the voice mailbox opened by the pet owner by means of the tag identification number given. Said messages are then available for retrieval by the pet owner. The phone service is also capable of accepting calls and messages from a finder of a lost pet before a voice mailbox is opened, and capable of storing those messages under the tag identification number given. Said telephone service then notifies the pet owner of the stored messages when the pet owner calls to open the voice mailbox.

For example, if a pet owner loses his/her pet, he/she would immediately call the phone number provided on the identification card. This phone number would connect the pet owner with a phone service, and allow the pet owner to open a voice mailbox which would be identified by the identification number on the identification card. Once the voice mailbox is opened by the pet owner, it is ready and able to accept calls from anyone who may find the pet. If the pet is found, the finder of the pet would then read the identification tag and call the phone number provided on the identification tag. This phone number would then connect the finder of the pet with the phone service provided, and would give instructions to the finder of the pet on how to access the voice mailbox opened by the pet owner. Access to the voice mailbox is achieved by entering the identification number found on the identification tag worn by the pet. Since both the identification tag and the identification card contain the same identification number, the voice mailbox is accessed using the number on the identification tag worn by the pet. Once the finder of the pet accesses the voice mailbox, a message may be left for the pet owner on where the pet may be found, or the finder may be contacted. The pet owner may occasionally call the telephone service provided, access the voice mailbox, and retrieve any messages left there by the finder of the pet.

Figure 2:
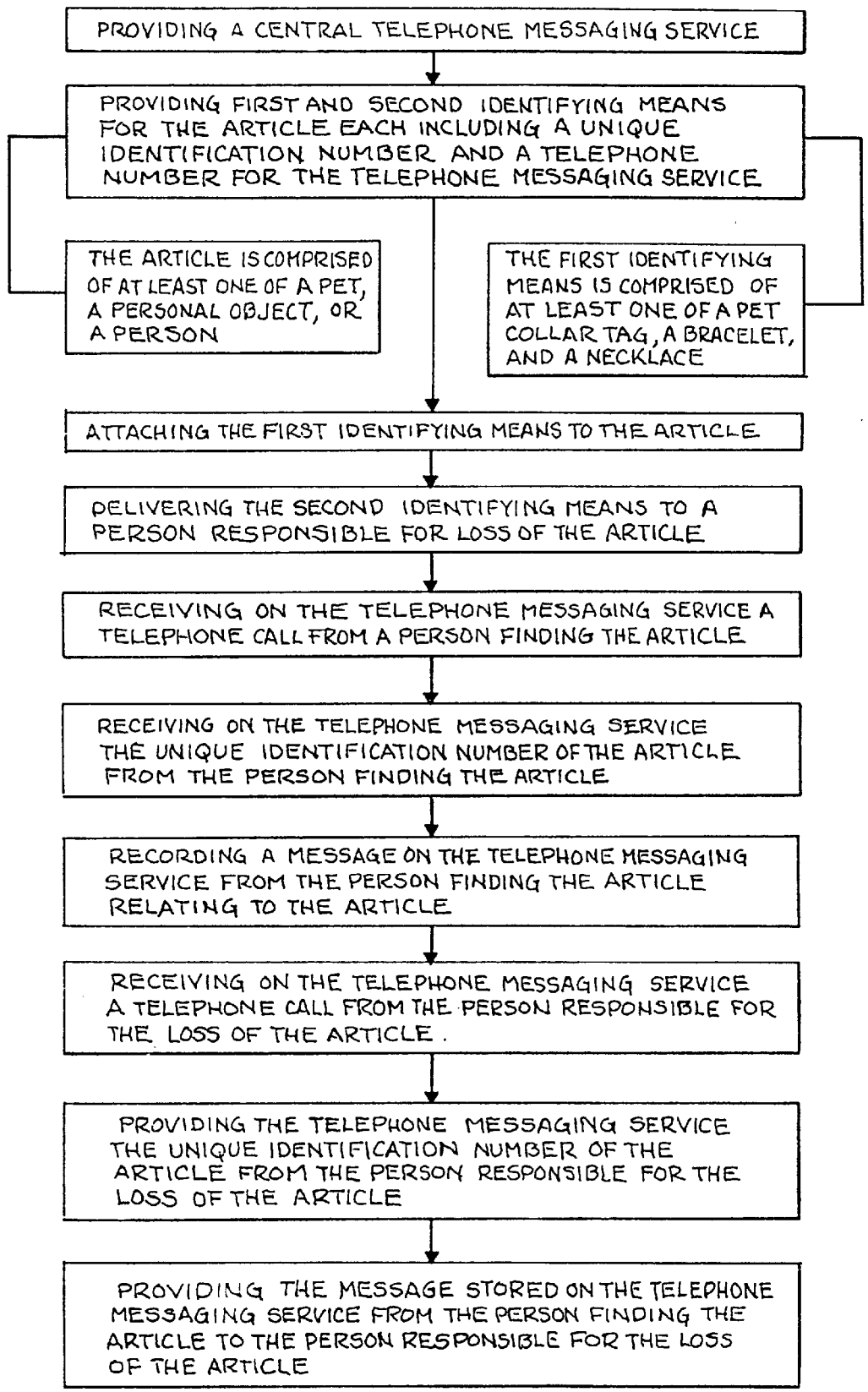
FIG. 2 is a flow chart illustrating the steps of an alternative embodiment of the invention.

Alternatively, the telephone service is able to accept and store messages under the tag identification number before a voice mailbox is opened by the pet owner. This way, if the finder of the lost pet calls the telephone service before the owner realizes his/her pet is missing, messages may be left regarding the whereabouts of the pet. When the pet owner calls the telephone service to open a voice mailbox to accept messages, the telephone service would then indicate to the pet owner that there were existing messages, and provide the pet owner access to any such existing messages. The method for locating a lost pet, object, or person, corresponding to the following first independent method claim (wherein the person losing an article contacts the telephone messaging service and leaves a message before the person finding the article contacts the messaging service), is shown in FIG. 1 of the drawings, which is a flow diagram. The method for locating a lost pet, object, or person, corresponding to the second independent method claim (wherein the person finding an article contacts the telephone messaging service and leaves a message before the person losing the article contacts the messaging service), is shown in FIG. 2 of the drawings, which is a flow diagram.

This method provides an easy and accurate way of locating a lost pet. Because the pet is identified by the identification number provided on the identification tag and identification card, the information does not have to be updated each time the owner relocates. Moreover, once the identification tag and card are purchased by the pet owner, the owner does not have to pay any continuous fees to keep the service active. The identification number is used by the owner only if the pet is lost, and then to open a voice mailbox to receive any messages regarding the whereabouts of the pet. The phone service can be accessed by any phone, regardless of where the owner is living.

The above method may also be used as a protective measure to aid in locating a lost child, elderly or incapacitated person. For example, an identification tag (e.g., bracelet, necklace, etc.) is provided containing an identification number and a phone number, which is attached to or worn by the person to be protected or located. Additionally, an identification card is provided for the relative or guardian of the person, said card containing the same identification number and a phone number to access a phone service. A phone service is provided, as described above, whereby the relative of a lost child or other person may call and open a voice mailbox using the identification number. If the lost child or other person is found, the finder may then call the number provided on the identification tag, access the voice mailbox using the identification number, and leave a message for the relative regarding the whereabouts of the found child, elderly or incapacitated person.

This, again, provides a method whereby an identification tag may be purchased one time, and given to the person to be protected or located, without the necessity of updating the information on the identification tag every time the concerned relative or guardian relocates. Regardless of where the relative is at the time a child, elderly or incapacitated person is discovered missing, the relative may open a voice mailbox using the identification number and provide a way for the finder of the person to contact the relative.

The above method may also be used to tag, identify and locate any item of personal property which can be labeled or attached to an identification tag with an identification number and phone number.

The invention has been described in detail with particular reference to a preferred embodiment thereof, but it will be understood that the invention is capable of other and different embodiments. As is readily apparent to those skilled in the art, variations and modifications can be affected within the spirit and scope of the invention. Accordingly, the foregoing disclosure and description are for illustrative purposes only, and do not in any way limit the invention, which is defined only by the claims.

I claim:

1. A telephone messaging method for locating a lost article comprising the following steps:

providing an article;

providing a central telephone messaging service;

said step of providing said central telephone messaging service further comprising the step of providing a computerized voice mail type system;

providing first and second identifying means for said article each including a unique identification number and a telephone number for said telephone messaging service;

attaching said first identifying means to said article;

delivering said second identifying means to a person responsible for loss of said article;

receiving on said telephone messaging service a telephone call from said person responsible for the loss of said article;

providing said telephone messaging service said unique identification number of said article from said person responsible for the loss of said article;

opening a voice mailbox identified by and electronically accessible by said unique identification number;

receiving on said telephone messaging service a telephone call from another person finding said article;

receiving on said telephone messaging service said unique identification number of said article from said another person finding said article;

electronically accessing said voice mailbox identified by said unique identification number;

recording an audio message in said voice mailbox from said another person finding said article; and providing said audio message stored in said voice mailbox of said telephone messaging service from said another person finding said article to said person responsible for the loss of said article.

2. The method of claim 1 wherein said article is comprised of at least one of a pet, a personal object, and a person.

3. The method of claim 1 wherein said first identifying means is comprised of at least one of a pet collar tag, a bracelet, and a necklace.

4. A telephone messaging method for locating a lost article comprising the following steps:

providing an article;

providing a central telephone messaging service;

said step of providing said central telephone messaging service further comprising the step of providing a computerized voice mail type system;

providing first and second identifying means for said article each including a unique identification number and a telephone number for said telephone messaging service;

attaching said first identifying means to said article;

delivering said second identifying means to a person responsible for loss of said article;

receiving on said telephone messaging service a telephone call from a person finding said article;

receiving on said telephone messaging service said unique identification number of said article from said person finding said article;

opening a voice mailbox identified by and electronically accessible by said unique identification number;

recording an audio message in said voice mailbox of said telephone messaging service from said person finding said article relating to said article;

receiving on said telephone messaging service a telephone call from said person responsible for the loss of said article;

providing said telephone messaging service said unique identification number of said article from said person responsible for the loss of said article;

electronically accessing said voice mailbox identified by said unique identification number; and providing said audio message stored on said voice-mail type system of said telephone messaging service prom said person finding said article to said person responsible for the loss of said article.

5. The method of claim 4 wherein said article is comprised of at least one of a pet, a personal object, and a person.

6. The method of claim 4 wherein said first identifying means is comprised of at least one of a pet collar tag, a bracelet, and a necklace.

* * * * *